(No Model.) 2 Sheets—Sheet 1.
VAN R. COLE & C. W. NEIKIRK.
HAY RAKE AND LOADER.
No. 449,462. Patented Mar. 31, 1891.
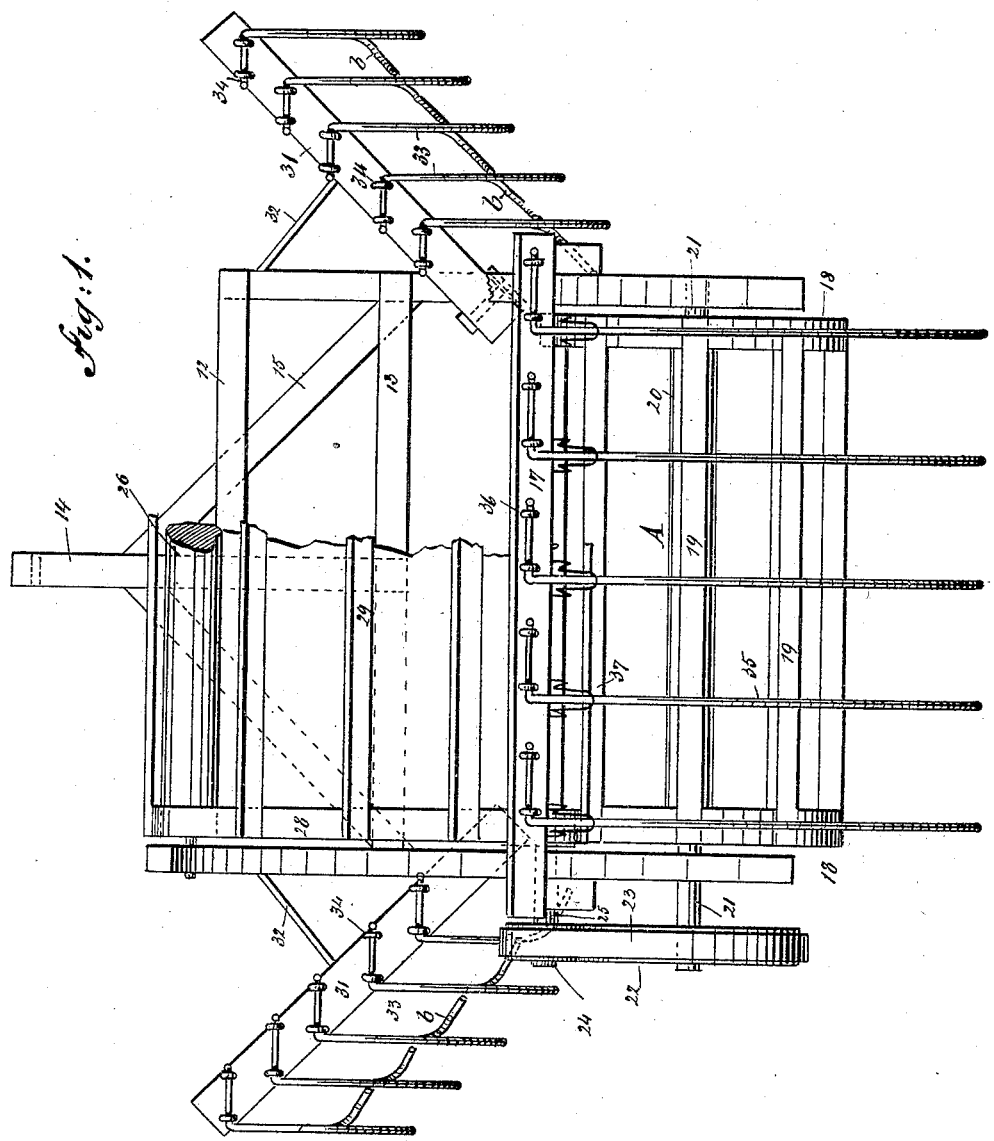
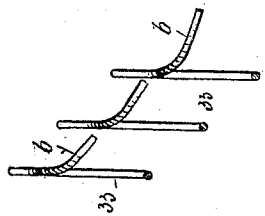
WITNESSES:
Chas. Nida.
C. Sedgwick.
INVENTORS.
Van R. Cole
BY C. W. Neikirk
Munn &Co.
ATTORNEYS.

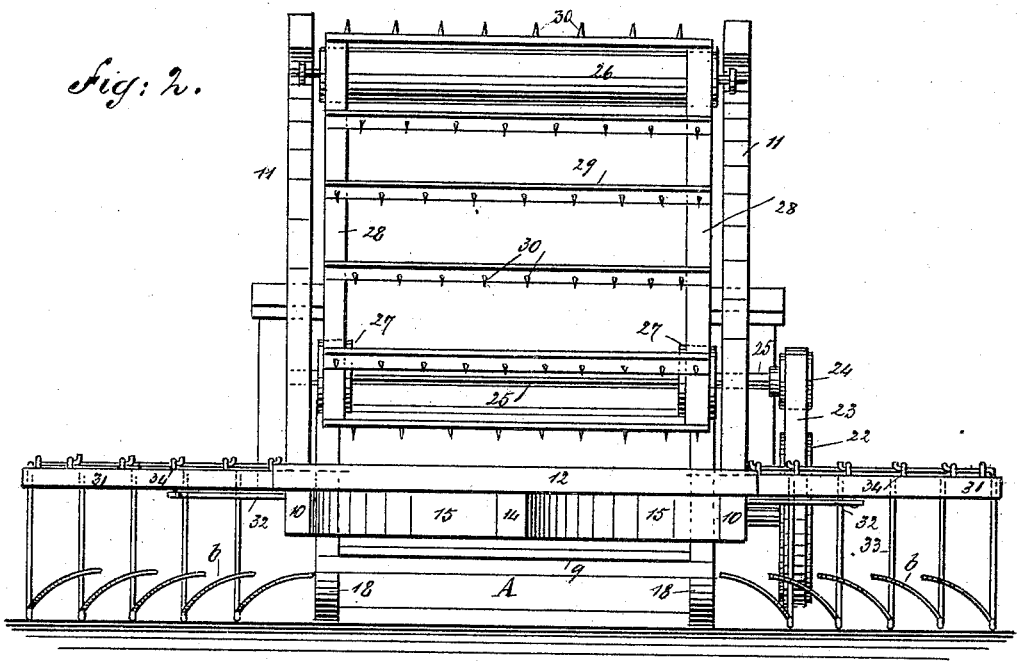

UNITED STATES PATENT OFFICE.

VAN RENSSELAER COLE, OF REPUBLIC, AND CHARLES WESLEY NEIKIRK, OF WEST LODI, OHIO.

HAY RAKE AND LOADER.

SPECIFICATION forming part of Letters Patent No. 449,462, dated March 31, 1891.

Application filed April 9, 1890. Serial No. 347,204. (No model.)

*To all whom it may concern:*

Be it known that we, VAN RENSSELAER COLE, of Republic, in the county of Seneca and State of Ohio, and CHARLES WESLEY NEIKIRK, of West Lodi, in the county of Seneca and State of Ohio, have invented a new and useful Improvement in Hay Rakes and Loaders, of which the following is a full, clear, and exact description.

Our invention relates to an improvement in hay rakes and loaders, and has for its object to provide a simple, durable, and readily-manipulated implement whereby hay may be gathered from the ground and automatically carried upward and delivered to a wagon; and a further object of the invention is to dispense with the ordinary drive and supporting wheels of the frame of the implement and substitute therefor a reel.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement, a portion of the elevating mechanism being partially broken away. Fig. 2 is a rear elevation. Fig. 3 is a side elevation, partially in section; and Fig. 4 is a section through the side rake-teeth on line 4 4 of Fig. 3, looking in the direction of the arrow.

The frame of the loader consists of the sides, each side being built up of a horizontal bar 10, an upper bar 11, which is attached to the rear extremity of each horizontal bar 10 and extends upward and forward, thereby imparting an angular contour to the sides, cross-beams 12 and 13 uniting the side bars 10 near their forward ends, to which cross-beams the tongue 14 and its braces 15 are secured, and the construction of the frame of machine is completed by attaching upwardly and rearwardly inclined standards 16 to the sides of the main frame near the rear ends thereof, which standards have secured thereto at or near their upper ends a cross-bar 17, which constitutes the head of the rear rake, to be hereinafter described.

In suitable journals attached to the angled sides of the main frame at the rear of the standards 16 the trunnions of a reel A are secured, the reel being of sufficient length to practically fill the space between the rear extremities of the opposing sides of the frame. The reel is constructed of two heads 18, which constitute the driving and supporting wheels of the implement, the heads being connected by a series of spaced bars 19, which bars are mortised in the heads or secured thereto in any suitable or approved manner, and the heads may be, if desired, and preferably are further connected by a central rod 20, of which rod the trunnions 21 of the reel may constitute an integral portion.

Upon the left-hand side trunnion of the reel a pulley 22 is rigidly secured, which is connected by a belt 23 with a smaller pulley 24, attached to a shaft 25, which shaft is journaled in suitable bearings attached to the upper bar 11 of the angular side of the frame a convenient distance above the upper portion of the reel, and a roller-shaft 26 is journaled in the upper portion of the said bars 11. Upon the lower shaft 25, near each side bar and between said bars, a drum-pulley 27 is securely fastened, over each of which drum-pulleys and over the upper drum-shaft 26 an endless belt 28 is passed, and upon said belts, transversely between the side bars 11 of the frame, a series of slats 29 are secured, which slats are preferably provided upon their outer faces with a series of teeth or pin-like projections 30.

To each of the horizontal bars 10 of the sides of the frame the inner end of a side rake-head 31 is secured, which rake-heads extend outward in opposite directions from the sides and in direction of the front, being held in their inclined position (best illustrated in Fig. 1) by suitable braces 32.

Upon the side rake-heads 31 a series of rake-teeth 33 is hinged. The upper ends of the rake-teeth are horizontal and bent at an angle to the body. They are secured in a diagonal position upon the rake-head by means of staples 34 or in any other approved manner, and the upper extremities of the rake-teeth are upturned to prevent the possibility of their being drawn from the staples. The bodies of the rake-teeth are curved downward and rearward to contact at their bottom with the surface of the ground, and the bottom of each rake-tooth comprises two members, the inner member b whereof extends or is curved laterally in the direction of the center of the frame of the implement. The inclination of the members b of the side rake-teeth is clearly shown in all the figures of the drawings, but especially in Fig. 4.

The rear rake-teeth 35 have their upper ends bent at a right angle to the body and the extremities are upturned, and the said upper ends of the rake-teeth are hinged to their head 17 longitudinally thereof, as shown in Fig. 1, by means of staples 36 or otherwise, as desired. The upper ends of the bodies of the rake-teeth 35 are made to pass through essentially U-shaped spring-guides 37, the outer extremities of which guides are upturned, as shown in Fig. 3, and the purpose of these guides is to limit the upward movement of the teeth. The bodies of the teeth 35 are curved downwardly over and beneath the reel a sufficient distance to contact with the ground as the implement is drawn forward and the lower ends of the rear rake-teeth are formed with two members, the inner member d of each tooth being concentric with the peripheral surface of the reel, as best shown in Fig. 3. Thus in operation as the implement is drawn forward the rear rake-teeth gather up the hay in their path, which is conducted by the reel and delivered to the elevator, consisting of the endless belts and their slats, and the said elevator in its turn delivers the hay to the wagon-body, to which the tongue of the implement is secured, as shown in Fig. 3, the attachment being made in the usual manner. It will be further observed that by reason of the forwardly and outwardly inclined position of the side rake-heads and the inward lateral bend of the inner members b of the side rake-teeth the said side rakes gather all the hay in their path and direct the same beneath the frame of the implement to be gathered by the rear rake-teeth as they advance. It may be further observed that by forming the rear rake-teeth at the bottom with two members, the inner ones of which are concentric with the reel, the said inner members serve as guides to direct and assist in the elevation of the hay from the ground, as the said inner members d of the rear rake-teeth when the said teeth are in contact with the ground are removed but a short distance from the periphery of the reel, as illustrated in Fig. 3.

Having thus described our invention, we claim as new and desire to secure by Letters Patent—

1. In a hay rake and loader, the combination, with a frame provided with an elevating mechanism and a supporting and driving reel journaled in said frame beneath said mechanism, of a rear rake the teeth of which are carried downward over and beneath the reel, the lower ends of said teeth being formed with two members, the inner members of which are concentric with the reel, and forwardly and outwardly disposed side rake-heads attached to the side bars of the frame and provided with teeth having their lower ends formed with two members, the inner members of which teeth are given a lateral and inward inclination, as and for the purpose specified.

2. A hay rake and loader comprising a frame formed of a horizontal portion and a forwardly-inclined portion, a driving and supporting reel journaled in the rear part of the horizontal portion of the frame, an endless elevator-belt mounted in the inclined portion of the frame, means for operating the endless belt from the reel, rake-teeth carried by standards of the frame and having their lower ends formed with two members, the inner one of which is concentric with the reel, and forwardly and outwardly projecting rake-heads secured to the side bars of the frame and provided with teeth formed with two members, the inner members of which incline laterally, substantially as herein shown and described.

VAN RENSSELAER COLE.
CHARLES WESLEY NEIKIRK.

Witnesses:
HENRI HELLER,
B. D. WYANT.